(12) United States Patent
Bartholomew et al.

(10) Patent No.: US 11,055,683 B1
(45) Date of Patent: Jul. 6, 2021

(54) COMPUTER-BASED SYSTEMS INVOLVING FINGERPRINT OR BIOMETRICALLY-ACTIVATED TRANSACTION CARDS AND METHODS OF USE THEREOF

(71) Applicant: Capital One Services, LLC, McLean, VA (US)

(72) Inventors: Cara L. Bartholomew, Mechanicsville, VA (US); Erin S. Smith, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/838,735

(22) Filed: Apr. 2, 2020

(51) Int. Cl.
| | | |
|---|---|---|
| *G06Q 20/20* | (2012.01) | |
| *G06K 19/07* | (2006.01) | |
| *G06K 19/077* | (2006.01) | |
| *G06Q 20/40* | (2012.01) | |
| *G06Q 20/34* | (2012.01) | |

(52) U.S. Cl.
CPC ......... *G06Q 20/20* (2013.01); *G06K 19/0718* (2013.01); *G06K 19/0723* (2013.01); *G06K 19/07773* (2013.01); *G06Q 20/34* (2013.01); *G06Q 20/401* (2013.01)

(58) Field of Classification Search
CPC ............... G06Q 20/20; G06K 19/0718; G06K 19/0723; G06K 19/07773
USPC .................................. 705/16, 39, 42, 71, 44
See application file for complete search history.

(56) References Cited

U.S. PATENT DOCUMENTS

| | | | | |
|---|---|---|---|---|
| 2007/0089168 | A1* | 4/2007 | Wang | G07F 7/1016 726/9 |
| 2007/0131759 | A1* | 6/2007 | Cox | G06K 19/0718 235/380 |
| 2014/0129356 | A1* | 5/2014 | Jain | G06Q 20/20 705/16 |
| 2016/0162883 | A1* | 6/2016 | Liscia | G06K 19/06206 705/71 |
| 2018/0219680 | A1* | 8/2018 | Kamal | H04L 9/3231 |
| 2018/0232546 | A1* | 8/2018 | Gardiner | G07F 7/0873 |
| 2018/0247033 | A1* | 8/2018 | Mathew | G06F 21/32 |
| 2019/0156324 | A1* | 5/2019 | Fontaine | G06Q 20/4012 |
| 2019/0392453 | A1* | 12/2019 | Agrawal | G06Q 20/341 |

* cited by examiner

*Primary Examiner* — Vanel Frenel
(74) *Attorney, Agent, or Firm* — Greenberg Traurig, LLP

(57) ABSTRACT

Transaction cards, systems and methods configured with card validation and fingerprint or other activation features. In one embodiment, an exemplary transaction card may comprise transaction circuitry configured to conduct purchase transactions, at least one fingerprint sensor, data storage configured to store fingerprint reference data, communication circuitry, card control circuitry configured to activate or otherwise control the card based on fingerprint verification, and computer readable media storing instructions for transmitting fingerprint verification information when a purchase transaction is attempted to POS device and/or an online entity.

23 Claims, 7 Drawing Sheets

COMPUTER-BASED SYSTEMS INVOLVING FINGERPRINT OR BIOMETRICALLY-ACTIVATED TRANSACTION CARDS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved transaction cards, improved computer-based platforms or systems, improved computing components and devices and/or improved computing methods configured for one or more novel technological applications involving fingerprint- or biometrically-activated transaction cards.

BACKGROUND OF TECHNOLOGY

Transaction cards and associated computer components, systems, networks and platforms may involve processing via a group of computers and/or other computing hardware devices that are linked and communicate via electrical subcomponents, communication components, and/or software applications associated with transaction cards, electronic transactions, and/or data processing.

OVERVIEW OF DESCRIBED SUBJECT MATTER

In some embodiments, the present disclosure provides various exemplary technically improved transaction cards that provide fingerprint or biometric based card activation and fraud prevention/detection for card-based transactions, the transaction cards comprising elements such as:
  transaction circuitry;
  wherein the transaction circuitry is configured to conduct purchase transactions that involve:
  i) a wireless computing device that is in a wireless communication with the transaction card;
  ii) an entity associated with each respective transaction; and
  iii) a server associated with a provider of the transaction card;
  at least one fingerprint sensor;
  wherein the at least one fingerprint sensor is configured to:
  i) detect at least one fingerprint of a respective transaction card user associated with the transaction card to generate a fingerprint input data; and
  ii) provide the fingerprint input data to the transaction circuitry:
  data storage;
  wherein the data storage is configured to store fingerprint reference data;
  wherein the fingerprint reference data comprises verified fingerprint data corresponding to at least one fingerprint of each respective authorized individual who is authorized to use the transaction card;
  communication circuitry;
  wherein the communication circuitry is coupled to the transaction circuitry;
  wherein the communication circuitry comprises wireless communication circuitry; and
  card control circuitry;
  wherein the card control circuitry is operationally coupled to one or more of:
  i) the transaction circuitry,
  ii) the at least one fingerprint sensor, and
  iii) the communication circuitry;
    wherein the card control circuitry is configured to:
    control one or both of the transaction circuitry and the communication circuitry based on a fingerprint verification that verifies based on the verified fingerprint data whether the at least one fingerprint of the respective transaction card user that has been detected by the at least one fingerprint sensor corresponds to the at least one fingerprint of a respective authorized individual;
  computer readable media storing instructions that, when executed by at least one processor, cause the card to perform operations comprising:
    transmitting, when a purchase transaction is attempted to an online entity, information related to validation of the fingerprint verification to the online entity by at least one of the wireless communication circuitry, the wireless computing device, the server, and a mobile device associated with the card user.

In some embodiments, the present disclosure also provides exemplary technically improved computer-based systems, computer-implemented methods, and computer-readable media, including media implemented with and/or involving one or more software applications, whether resident on computer devices or platforms, provided for download via a server and/or executed in connection with at least one network that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
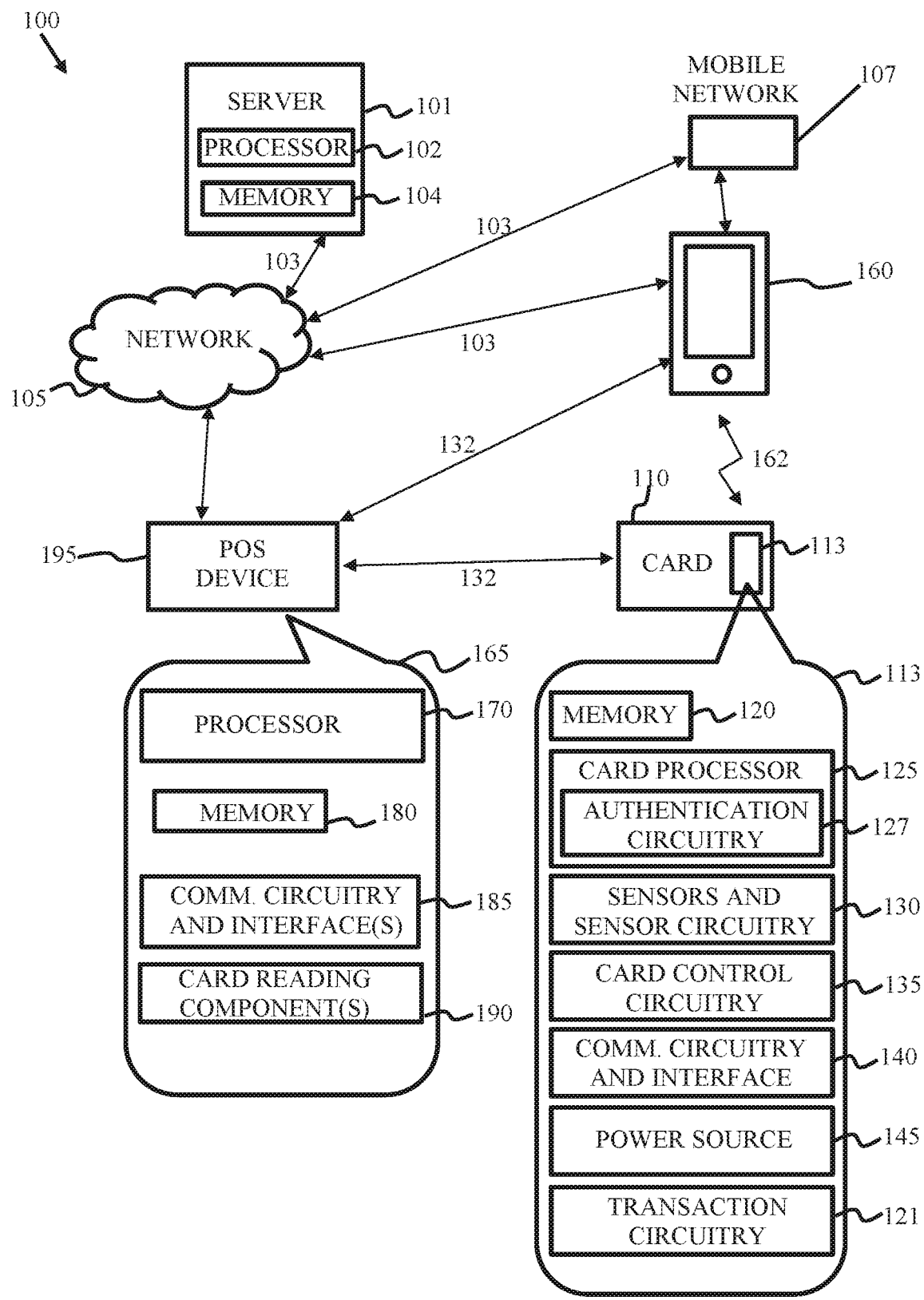
FIG. 1 is a block diagram of an exemplary system and/or platform involving features of performing fingerprint or biometric activation based card-based transactions at a POS device, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In some embodiments, the term "transaction card" can refer to an electronic card with at least one embedded microprocessor. In some embodiments, the transaction card may be dimensioned and/or be utilized such as, but not limited to, a conventional credit or debit card issued to account holders by banks and other financial institutions. In some embodiments, the transaction card may be dimensioned and/or be utilized such as, but not limited to, personal identification cards, health entitlement cards, store loyalty cards, stored value cards (electronic purses), information storage cards, and the like. In some embodiments, the transaction card may be dimensioned, but not limited to, in accordance with international standard ISO/IEC 7810, ID-1 format, which specifies dimensions of 85.60 mm (85.60× 10−3 m) long by 53.98 mm (53.98×10-3 m) wide. In some embodiments, the transaction card may be dimensioned, but not limited to, in accordance with international standard ISO/IEC 7813 further specifies the thickness as 0.76 mm (0.76×10−3 m). For example, the transaction card may be made of a plastic material, metal or similar material, and may have convenient overall dimensions of 7.5 cm by 11 cm by 1 cm similar to a common wallet.

As explained in more detail, below, transaction cards, systems, and methods for performing fingerprint or biometric based transaction card activation, e.g., for POS and/or online transactions, are disclosed. In one embodiment, an exemplary transaction card may comprise one or more fingerprint sensors configured to detect fingerprint sensor data regarding a user of the transaction card to generate a fingerprint input data, and data storage configured to store the fingerprint reference data, which comprises verified fingerprint data corresponding to at least one fingerprint of each respective service authorized individual who is authorized to use the transaction card. According to some aspects, the fingerprint based card activation may comprise: control one or both of the transaction circuitry and the communication circuitry based on a fingerprint verification that verifies based on the verified fingerprint data whether the at least one fingerprint of the respective transaction card user that has been detected by the at least one fingerprint sensor corresponds to the at least one fingerprint of a respective authorized individual; and transmitting, when a purchase transaction is attempted to an online entity, information related to validation of the fingerprint verification to the online entity by at least one of the wireless communication circuitry, the wireless computing device, the server, and a mobile device associated with the card user. In one more detailed example, the fingerprint based card activation may comprise: upon verifying that the one or more fingerprints are valid, the control circuitry being configured to one or both of: allow the card to perform wireless communication to execute transactions; and/or activating the card for purpose of completing transactions; activating the card control circuitry, when the card enters a proximal engagement, e.g. by tap, NFC, Bluetooth, etc., with a point of sale terminal or a mobile device associated with the card user, from a sleep mode in which a transaction capability is disabled; and/or activate, upon verifying that the one or more fingerprints are valid, the card for purpose of completing transactions.

According to some embodiments, the transaction cards and other innovations herein may be implemented in connection with a financial service entity that provides, maintains, manages, or otherwise offers financial services. Here, for example, the financial service entity may be a bank, credit card issuer, or any other type of financial service entity that generates, provides, manages, and/or maintains financial service accounts that entail providing a transaction card for one or more customers, such as a transaction card for use at a POS device or with an online entity for an online purchase or transaction that involves or is associated with such financial service entity. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary system 100 associated with fingerprint or biometric activation associated with use of a transaction card by an individual, in accordance with one or more embodiments of the present disclosure. System 100 may include a server 101, a mobile device 160, a transaction card 110 with circuitry 113 disposed therein, and a point-of-service or point-of-sale (POS) device 195, which may all communicate 103 over a communication network 105. When a user attempts a transaction with a transaction card, the business or merchant associated with the POS device 195 and typically a financial institution, such as a credit card company that has issued the card to the user, may wish to determine or verify whether the user using the credit card is the authorized user in order to approve the transaction. Some embodiments herein may also leverage the fact that the user of the transaction card may most likely carry or is near to the user's mobile device, such as a cellphone, tablet or smartphone, for example, and may use functionality associated with the user's mobile device and the transaction card, including interaction between the two, as a part of various fingerprint activation and/or authentication processes for approving a transaction and/or authorizing the user to use the transaction card to purchase goods or services.

In some embodiments, server 101 may be associated with one or more entities that are stakeholders to the attempted transaction, such as the business or merchant, one or more financial services providers, such as an issuer of a credit card, debit card, or other transaction card associated with the attempted transaction.

In some embodiments, transaction card 110 may include various circuitry 113 including circuitry capable of communicating 132 various card-related information from the transaction card 113, through the POS device 195 or other devices (e.g., 160) or networks, to an online entity or computer system. Such card-related information may include activation and/or authentication instructions based on one or more fingerprint inputs associated with a use of the one or both of the card and the mobile device for the transaction.

In the embodiment shown in FIG. 1, an illustrative POS device 195 may comprise: at least one processor 170, i.e., one or more processing components and/or computer readable media, memory 180, communication circuitry and/or interfaces 185, and at least one card reading component 190. The card reading component(s) 190 may be configured to read information from a transaction card 110, for example, the at least one card reading component may comprise one or more of a magnetic stripe reader, a chip reader, and/or a first near field communication (NFC) component. Communication circuitry and/or interfaces 185 may comprise at least one mobile device transceiver component configured to communicate, e.g., in connection with a purchase transaction, with a mobile device 160 presented for payment, the mobile device transceiver component comprising a second NFC component.

With regard to the disclosed innovations, the processing components and/or computer readable media 170 may be configured to execute instructions associated with performing methods for receiving the information related to the validation of fingerprint verification for purposes of authenticating the transaction card 110 to complete the transaction attempted with the card 110 by a user. In some embodiments, the processing components and/or computer readable media 170 may be configured to execute instruction associated with, when the transaction is attempted to a contactless, NFC-enabled point of sale (POS) terminal, receiving the information related to whether or not the card is active and/or authenticated. In other embodiments, the processing components and/or computer readable media 170 may be configured to execute instruction associated with communicating by the Bluetooth communications with an application on a mobile device associated with the card user regarding performance of additional processing associated with the transaction attempt.

It is noted that the disclosed transaction cards, systems, platforms, methods, and computer-readable media include or involve fingerprint based card activation features that may include and/or involve various computing systems and/or components configured to perform various automated functionality set forth herein. Unlike existing solutions using conventional transaction cards, the present innovations may utilize an improved transaction card 110 that may, via obtaining the fingerprint inputs from the transaction card at or near the time of authorizing the transaction, provide improved features for activating the card and/or authenticating/validating the transaction. In these and other ways, implementations involving the present transaction card and associated features, and functionality based on such fingerprint authentication represent improvements over existing fraud prevention cards and techniques.

The disclosed implementations for fingerprint based card activation for online or point-of-service transactions also improves utilization of both processing and communication resources. As an initial matter, the present embodiments may store verified fingerprint data from respective authorized users of a transaction card thereon as reference data, and transmit the information relating to validation of the fingerprint verification to an online entity and/or to or through a POS device involved in an attempted transaction with the card. This obviates communication bandwidth otherwise used for network access during the transaction to perform fraud prevention/detection, such as with prior systems, e.g., those that require contact with a financial institution to perform the fraud prevention/detection on the server side and transmit instructions back to the online entity/POS device to authorize the transaction; and those that require contact with a financial institution to specify a transaction-lock-on or transaction-lock-off status for a transaction card, manually, on the server side and transmit the transaction-lock-on and/or transaction-lock-off status back to the POS device/online entity to authorize the transaction. Such benefits are achieved by embodiments that include receiving one or more fingerprint inputs from the transaction card and/or the mobile device of the user, and initiating at least one second factor authentication process when the fingerprint input does not indicate validation of the fingerprint verification. Further, because present embodiments need only perform a straightforward receipt of the information relating to the validation of the fingerprint verification of the transaction card, involving any additional entities and computer systems outside/beyond the POS device/online entity, the processing and compute resources required are reduced substantially compared to existing techniques. Moreover, improved transaction cards having instant on-card user authentication mechanisms, together with improved communication features, improve responsiveness, efficiency, accuracy, robustness, autonomousness and fault-tolerance ability for fraud prevention. Implementations herein also reduce likelihood of merchant exposure to fraud involving cards and/or mobile devices, as well as likelihood of "lag time" caused by communication or network intermittent availability or failures, thereby reducing or eliminating the need for communicating with remote entities at the moment of the transaction to make a fraud determination.

Turning back to FIG. 1, server 101 may include at least one processor 102 and a memory 104, such as random-access memory (RAM). In some embodiments, server 101 may be operated by the financial institution issuing the transaction card, by the merchant, and/or by any transaction clearing house used for authorizing the credit card for use.

Transaction card 110 may be formed from plastic, metal, or any other suitable material. Transaction card 110 may include card circuitry 113 formed directly therein, and/or disposed therein by gluing, bonding or by any suitable adhesion method for affixing circuitry to the material of transaction card 110. Card circuitry 113 may be configured to utilize any hardwired circuitry. Card circuitry 113 may be implemented as one or more integrated circuit chips, and/or electronic devices, electrically interconnected and bonded to one or more circuit boards, for example. Further details and embodiments of exemplary transaction cards are shown and described in connection with FIGS. 2-3, below.

Referring to the block diagram of FIG. 1, card circuitry 113 may include a memory 120, at least one processor 125, transaction circuitry 121, sensors and circuitry 130 associated with acquiring the fingerprint data and information, authentication circuitry 127, communication circuitry and interface 140, and, optionally, a power source 145. Transaction circuitry 121 may comprise various electronic circuitry and/or components, including, in some embodiments, an embedded processor. Memory 120 may store code, such as for the authentication circuitry 127, which when executed by processor 125 may cause processor 125 to implement verifying and transmitting data to the online and/or POS computers, and/or for other, related schemes herein (such as pairing with mobile device 160) to perform fingerprint activated card based fraud prevention/detection. As set forth in more detail, below, such features provide means to verify whether or not a user of transaction card 110 is an authorized user of the card, e.g., to approve the transaction when the user attempts to use the transaction card to purchase goods and/or services, e.g., online, at POS devices, etc.

In some embodiments, transaction card 110 may include various fingerprint sensors and sensor circuitry 130, which may be connected via respective electrical connections to memory 120, card processor 125, card control circuitry 135, transaction circuitry 121, communication circuitry and/or communication interface 140, and/or power source 145. In general, card control circuitry 135 refers to circuitry configured for controlling operation and functioning of the card, and transaction circuitry refers to circuitry configured for performing transactions (such as financial transaction) between the card and other devices or systems; however, it should be understood that such circuitry may also be implemented as a single component. The communication circuitry and/or communication interface 140 may include a computer bus, electrical components or circuitry configured for communication via contact or contactless interconnections, various circuitry for the wireless communication features described elsewhere herein, and the like. With regard to the disclosed innovations, the fingerprint sensors and sensor circuitry 130 may be configured to detect at least one fingerprint of a respective transaction card user associated with the transaction card 110 to generate a fingerprint input data. The fingerprint sensors and sensor circuitry 130 may also provide the fingerprint input data to the transaction circuitry 121.

Here, for example, the user-specific fingerprint data may comprise one or both of: i) first fingerprint data regarding at least verified fingerprint data associated with the transaction card 110 by the user; and ii) second fingerprint data regarding at least one activity, associated with the transaction card 110, engaged into by the user. In some embodiments, the fingerprint data may be collected by the one or more sensors 130, such as to activate the card 110 to begin or conduct a transaction. Here, for example, such sensors may comprise fingerprint and/or biometric sensors, including one or more of in-display sensors, capacitive sensors, optical sensors, blood and/or heart based sensors (e.g., blood flow, pulse, heart rate, etc.), infrared sensors, integrated sensors such as those buried beneath a coating or layer, covered sensors (e.g., ceramic, glass, sapphire, etc.), coated or hard coating sensors, and/or other fingerprint and biometric sensors, such as traditional fingerprint sensors. Examples of some such sensors are those manufactured by Goodix Technology Co., Ltd. In some embodiments, the sensor 130 may comprise a combined capacitive fingerprint and an optical sensor, or otherwise be configured, to detect blood flows and infrared (body) signals. In embodiments where the sensor 130 will occupy a specific position on a transaction card 110, the transaction card 110 may also include at least one tactile element 262 (FIG. 2) that the user's finger may engage with to guide at least one finger into engagement with the card into a position where the finger(s)/fingerprint(s) are seated such that verification by the first fingerprint sensor and the second fingerprint sensor is provided. In implementations, a selection of the user's fingers to which one or both of the first fingerprint sensor and the second fingerprint sensor correspond may be customizable to the user. In another example, the user-specific fingerprint data may comprise a first fingerprint sensor on a top surface of the card 110 and positioned to receive a fingerprint of a finger that the user utilizes to hold the card 110 when inserting the card into a point-of-sale (POS) device. Here, the top surface may be a planar surface of the card that faces upward or toward the user when the card is inserted into the POS device. Further, the first fingerprint sensor may be: (i) positioned overlapping or adjacent a center axis of the card 110, and (ii) spaced substantially along the center axis between a center point of the card 110 and about $\frac{1}{16}$ inch from a first end of the card 110 opposite to a second end of the card 110 that is inserted into the POS device.

In some embodiments, transaction circuitry 121 may be configured to conduct purchase transactions with the card 110. For example, such purchase transactions may involve one or more of: i) a wireless computing device that is in a wireless communication with the transaction card; ii) an entity associated with each respective transaction; and/or iii) a server associated with a provider of the card 110. In one embodiment, the transaction circuitry may include the one or more components that are configured to conduct transactions involving a point of sale (POS) device. In some embodiments, the transaction circuitry may further comprise one or more of: an EuroPay-MasterCard-Visa (EMV) chip, an EMV processor, wireless, near field communication (NFC), and/or Bluetooth communication chips/circuitry, or other financial transaction circuitry known in the art.

In some embodiments, card control circuitry 135 may be configured to operationally coupled to one or more of: the transaction circuitry 121, the fingerprint sensor 130, and/or the communication circuitry 140. According to various examples, the card control circuitry 135 may be configured to control one or both of the transaction circuitry 121 and the communication circuitry 140 based on a fingerprint verification that verifies based on the verified fingerprint data. Such fingerprint verification verifies whether the fingerprint of the respective transaction card 110 user that has been detected by the fingerprint sensor 130 corresponds to the at least one fingerprint of a respective authorized individual. In one embodiment, the card control circuitry may be further configured to turn on or off the Bluetooth circuitry such that the card 110 is not detectable by nearby Bluetooth devices.

In some embodiments, the communication circuitry 140 may comprise one or both of: one or both of a near field communication (NFC) circuit and a Bluetooth communication circuit.

In some embodiments, power source 145 may be used to power card circuitry 113. Power source 145 may include, for example, a battery, a solar cell, and/or any suitable energy harvesting device, capable of generating enough power for powering card circuitry 113. In other embodiments, the transaction card may be powered upon swiping or inserted the card into a slot in POS terminal 195 such that the power source may be POS terminal 195 itself or any other device into which the transaction card is swiped or inserted. The transaction card 110 may also be powered by movement, or by induction, or by other near-field electromagnetic energy derived from nearby sources, such as mobile device 160, POS device 195, or other known sources. Once powered, the transaction card may begin assembling the sensory data and/or feature set for communication to the POS terminal 195.

Mobile device 160, such as a smart phone or other portable or wearable electronic device, may include mobile device circuitry. Mobile device circuitry may include a mobile device processor, a memory, such as RAM, communication circuitry and interface, and any input and/or output device, such as a touchscreen display. RAM may store code that, when executed by processor, may cause processor to implement aspects of one or more fraud detections schemes herein, including those involving pairing with transaction card 110 to verify if a user of the transaction card 110 is an authorized user of the card. In some embodiments, any transaction card application running on mobile device 160, such as an application supplied by the financial institution issuing the transaction card and/or managing the transactions of the transaction card user, may include various modules that may transmit information to the POS device, relay information back to the financial institution (e.g., server 101), and communicate with other computing components.

Various embodiments associated with FIG. 1 and related disclosure herein solve a technical problem of ensuring that a transaction card is only activated for use by the authorized user of the transaction card, e.g., the account owner, and/or authorized users. Various features and functionality disclosed herein may be utilized in connection with fraud prevention and/or fingerprint based authentication processes that involve pairing of transaction card 110 with mobile device 160 when implementing multi-factor authentication (MFA) schemes, for example to authorize the card for use by the user. In other embodiments, various information related to the successful pairing of the transaction card and the mobile device may be relayed back to server 101 (e.g., server processor 102) so as to approve transactions for purchasing goods and/or services with the authenticated user's transaction card.

In some embodiments, an initial authentication for pairing the transaction card with the mobile device may be implemented by the user contacting the financial institution from the user's mobile device to initially authorize the pairing of transaction card 110 with mobile device 160 so as to receive pairing approval. In other embodiments, the pairing and/or unpair processes between the transaction card and the mobile device may occur automatically and seamlessly such as without any action on the part of the user, particularly if the same mobile device had been previously paired with the same transaction card in the past. In yet other embodiments, proximity MFA may use biometrics (e.g., fingerprint, voice recognition, etc.) and/or a password entered by the user and/or a swiping of the mobile device screen by a finger of the user and/or the proximity of the transaction card to the mobile device or any client device, for example, to pair or unpair the transaction card with the client.

In some embodiments, when the transaction card may include a battery as power source 145, the transaction card and the mobile device may be configured to pair with the transaction card on the fly when the transaction card is used during a transaction, so as to conserve power stored in the battery.

In some embodiments, if the transaction card is determined to be in possession by an unauthorized individual via implementations herein, e.g. at the card 110, at/via POS device 195, an entity associated with the transaction, such as the merchant deploying the POS terminal 195, may generate or receive an alarm or alert that the card user is potentially unauthorized (e.g., an alert on a display of POS terminal 195) or that additional authentication, such as second-factor authentication, should be performed to verify that the transaction is not fraudulent.

Figure 2:
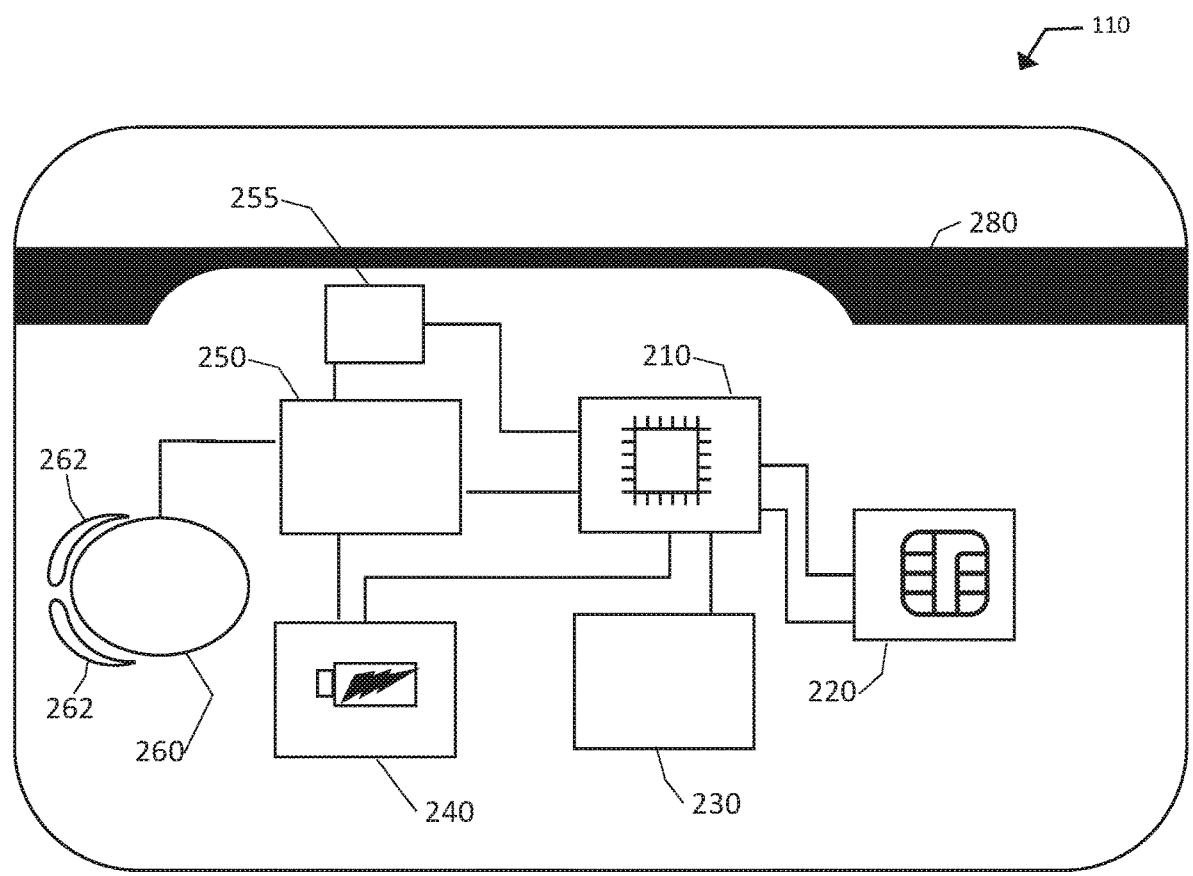
FIG. 2 is a block diagram of an exemplary transaction card, consistent with exemplary aspects of certain embodiments of the present disclosure.

FIG. 2 shows a diagram of an exemplary transaction card 110, consistent with disclosed embodiments. In some embodiments, transaction card 110 may be the approximate size and shape of a traditional credit card, debit card, or the like. Transaction card 110 may have embedded electronics for performing various aspects of the disclosed innovations. As shown, transaction card 110 may include at least one processor 210 or processing circuitry, memory 230, power source or power circuitry 240, fingerprint input elements and/or circuitry 260, one or more other sensors 250, communication circuitry/devices 255, a magnetic stripe 280, and other coupling circuitry 220 such as an electronic chip element and associated interconnects. Power source or power circuitry 240 may include elements that generate power for the card upon coupling to a POS device, such as by connection via an electronic chip, and/or such circuitry may include a voltage supply such as a battery. In some embodiments, transaction card 110 may include more or fewer components than shown in FIG. 2.

Processor 210 may comprise one or more known or specialized processing devices, of sufficient size and form factor to fit within transaction card 110 when configured to be about the size of a traditional credit or debit card. In some embodiments, processor 210 may include any configuration capable of performing functions related to the disclosed methods such as, for example, generating and transmitting the identifier, information relating to the validation of the fingerprint verification associated with usage of the transaction card 110, which may be based on the various fingerprint inputs 250, 260 generated by the transaction card 110. Processor 210 may also control power source 240, send and receive data, read from and written to memory 230, receive and analyze data from sensors 250, process information or instructions associated with the coupling circuitry 220, receive and process input from the fingerprint input elements and/or circuitry 260, and any other functions consistent with the disclosed embodiments.

Memory 230 may include volatile or non-volatile, magnetic, semiconductor, or other type of storage elements and/or tangible (i.e., non-transitory) computer-readable medium that stores relevant instructions and data, such as information needed for or associated with conducting card transactions. With regard to the fingerprint validation result generated by the card 110, such instructions, when executed by the processor 210, cause the card 110 to perform operations associated with fingerprint based card activation. In some embodiments, the operations may comprise transmitting, when a purchase transaction is attempted to an online entity, information related to the validation of the fingerprint verification to the online entity by the wireless communication circuitry 255. In one example, the information related to the validation of the fingerprint verification is transmitted to one or more of: a wireless computing device, a server, and/or a mobile device associated with the card user. In another example, the information related to the validation of the fingerprint verification is transmitted to one or both of: (i) at least one merchant computer associated with the online entity, and (ii) the server associated with the provider of the transaction card 110, to authorize the transaction attempt.

In some embodiments, the operations may be further configured to: (i) activate the card control circuitry 135, when the card 110 enters a proximal engagement with a point of sale terminal or a mobile device associated with the card user (e.g. via tap, NFC, Bluetooth, etc.), from a sleep mode in which a transaction capability is disabled; (ii) activate, upon verifying that the detected fingerprints are valid, the card 110 for purpose of completing transactions; and/or (iii) transmit the transaction by a suitable communication medium (e.g., NFC, RFID, Narrow Band Internet of Things (NBIOT), WiFi, WiMax, ZigBee, Bluetooth, etc.).

In other embodiments, the instructions may comprise an applet comprising instructions for validating the transaction or the card 110 by requiring one or more of: i) an additional validation action; and/or ii) additional communication with an application on a mobile device associated with the card user. Here, for example, the additional validation action may include a supplemental communication with the user to validate the online purchase transaction, such as via text, phone call, etc., supplemental action performed via an online application associated with the transaction card (such as requiring the user to log into their mobile app), and/or other communications to a user that enable the user to reply with an electronic communication to confirm such purchase, such as a communication to any laptop, mobile or wearable device selected by the user. The additional communication with an application on the user's mobile device may include, for example, activating the card or changing a setting within the application, responding to a prompt within the application requesting validation of the purchase transaction, or simply requiring the user to successfully log into an app, such as an online app, mobile app, or the like.

According to various embodiments, the operations may further comprise one or both of: (i) inform a point of sale (POS) terminal, at which the transaction is submitted, whether or not the card 110 is authorized to complete the transaction; and/or (ii) instruct a point of sale (POS) terminal to communicate by the Bluetooth communications with an application on a mobile device associated with the card user regarding performance of additional processing associated with the transaction attempt.

In some embodiments, the operations may further comprise transmitting, when the purchase transaction is attempted to a contactless, NFC-enabled point of sale (POS) terminal, status information to the POS terminal, where such 'status information' may comprise information regarding: (i) a status of the card, identifying that the card 110 is inactive (or active), and (ii) an instruction requiring the card user to contact or present the card to the POS terminal with a valid fingerprint obtained by the one or more fingerprint sensors 130 to authenticate himself or herself and activate the card 110 to authorize the purchase transaction.

Data of fingerprint reference, and/or prior verified fingerprint data, and/or identifiers may also be stored in the memory, 230, wherein a list of such data may be maintained and used for determining the current verification of the fingerprint data associated with the owner/user of the transaction card. In one exemplary implementation, the reference data regarding a card owner's and/or user's prior verified fingerprint data is stored in data storage and/or the memory. According to embodiments herein, the memory 230 may also store user information, data needed or used by the card or the POS device to achieve the innovations herein, other computer-executable instructions and/or data known in the art.

Power source 240 may include a power storage device such as a battery or capacitor, a power receiver such as an inductive power coil or a wireless power receiver, a power generator such as a solar or kinetic power generator, or any combination thereof. In some embodiments, power source 240 may include one or more other known devices capable of generating, receiving, and/or storing electrical energy.

In some embodiments, one or more sensors 250 may include one or more devices capable of sensing the environment around transaction card 110, movement of the transaction card 110, and/or other detectable interactions involving the transaction card 110. In some embodiments, as explained in more detail in connection with FIG. 3, such sensors 250 may include, for example, one or more of a camera, an optical sensor, a microphone, a gyroscope, an accelerometer, a shock sensor, a position sensor, a light sensor such as an ambient light sensor, a temperature sensor, a touch sensor, a conductivity sensor, and/or a haptic sensor. In some embodiments and, optionally, in combination of any embodiment described above or below, at least one environmental condition may be one of: temperature, humidity, vibration, shock, sound, light, presence of air contaminant, acceleration, pH, location, presence of at least one odor, presence of at least one gas (e.g. volatile organic compounds (VOC), nitrogen, ozone, CO2), air pressure, and any combination thereof. For example, the gas sensors may measure one or more of ethylene, ammonia, acetylene, nitrogen, carbon dioxide, oxygen.

Sensors 250 may also include one or more buttons, switches, other tactile input mechanisms, or other forms of user-derived input for receiving an indication or instruction from a card user. In some embodiments, such input devices may receive a sequence or series of inputs, to cause processor 210 to perform various functions associated with the disclosed embodiments.

Further, while shown separately at 260, fingerprint inputs may also be obtained via the fingerprint input elements and/or circuitry 260. In some embodiments, such fingerprint input elements and/or circuitry 260 may include, for example, one or more of a fingerprint sensor. In some embodiments, the fingerprint input elements and/or circuitry 260 includes a first fingerprint sensor on a first face of transaction card 110, and/or a second fingerprint sensor located on a second face of transaction card 110 opposed to the first face. The first fingerprint sensor is located at a first particular region of one end of transaction card 110 so that the first fingerprint sensor is positioned to receive a first fingerprint of a first finger that the user utilizes to grasp transaction card 110 when making a contactless transaction with transaction card 110. The second fingerprint sensor is located at a second particular region of the second face of transaction card 110, wherein the second fingerprint sensor is positioned to receive a second fingerprint (e.g., here and elsewhere, a thumbprint may be a type of fingerprint captured) of a second finger that the user utilizes to grasp transaction card 110 when making a contactless transaction with transaction card 110.

The transaction card may, optionally, also include a display, which may comprise a screen, indicator light, or other appropriate device for displaying a status or message to user. In some embodiments, display may include a small LCD screen, e-ink screen, or OLED display or one or more LEDs. In some embodiments, display may provide notifications, prompts, and/or messages to user.

In some embodiments, transaction card 110 may include communication circuitry/devices 255 such as antennae and/or NFC (near-field communication) circuitry, for transmitting and/or receiving data from one or more external locations. Communication circuitry 255 may comprise a short-range wireless transceiver, or a near-field communication (NFC) chip. Communication circuitry 255 may be configured to communicate with mobile device 160, a contactless card reader associated with the POS device 195, other systems, and/or other sensors configured to detect the presence of transaction card 110. In other embodiments, communication circuitry/devices 255 may comprise Bluetooth circuitry for processing Bluetooth communications. In one example, the Bluetooth circuitry may comprise at least one Bluetooth antenna configured for Bluetooth low energy (BLE) communication. In another example, communication circuitry/devices 255 may comprise RFID communication circuitry. According to various embodiments, wireless access to user data on the card 110 is disabled until the card 110 is activated by verifying that the one or more detected fingerprints are valid.

In some embodiments, transaction card 110 may include at least one magnetic stripe 280 or other magnetic communication medium that may share or read magnetically-stored information.

In some embodiments, magnetic stripe 280 may be controlled by processor 210. For example, processor 210 may write, clear, and rewrite magnetic stripe 280, to provide particular account information.

Figure 3:
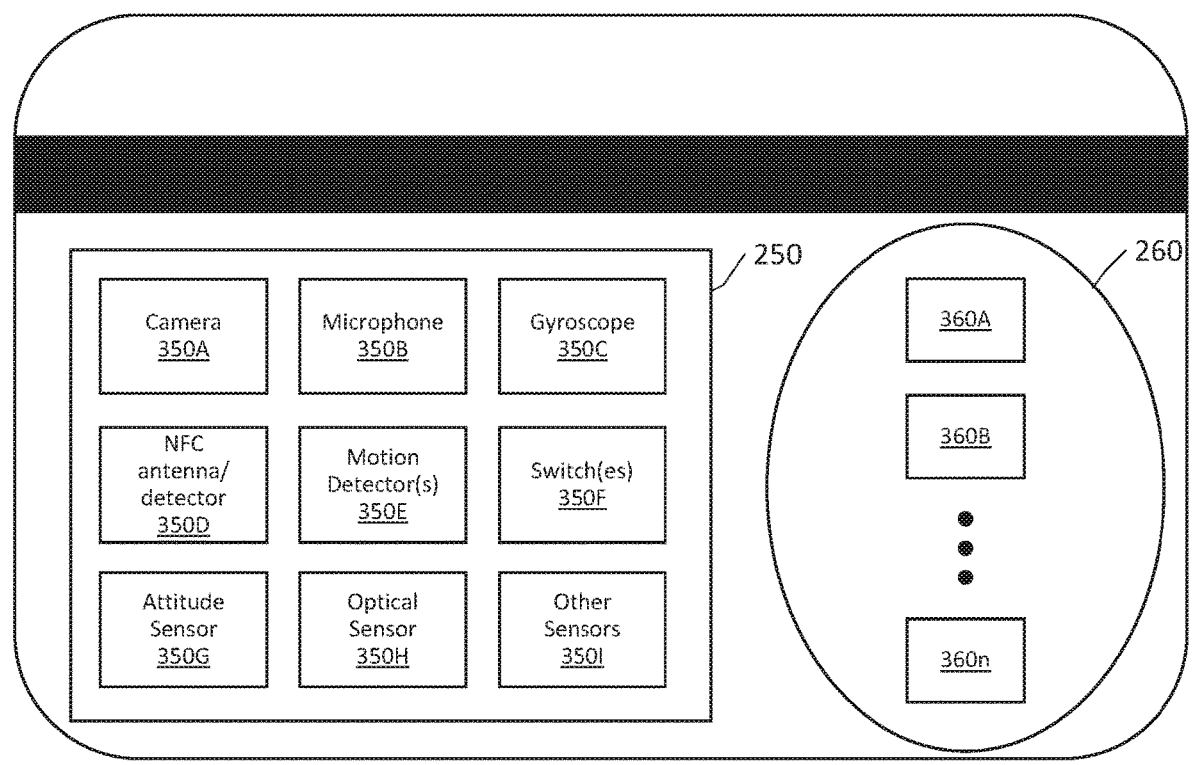
FIG. 3 is a block diagram of certain illustrative aspects of an exemplary transaction card, consistent with exemplary aspects of certain embodiments of the present disclosure.

FIG. 3 is a block diagram of certain illustrative aspects of an exemplary transaction card, consistent with exemplary aspects of certain embodiments of the present disclosure. Referring to FIG. 3, a simplified block diagram showing various exemplary sensors 250 and fingerprint input elements and/or circuitry 260 of transaction card 110 is illustrated. In various embodiments, the sensors 250 may comprise, for example, one or more of: a camera 350A, a microphone 350B, a gyroscope 350C, a NFC antenna and/or detector 350D, one or more motion detectors 350F such as an accelerometer, pedometer and/or linear acceleration sensor, one or more switches 350F including various tactile or touch sensitive elements, an attitude sensor 350G, one or more optical, light or IR sensors 350H, and/or other sensors 350I such as a GPS-related sensor, an electronic compass, a network card to detect nearby Wi-Fi, RF or other NFC/wireless signals, and/or other such sensors known in the art. Further, the fingerprint input elements and/or circuitry 260 may comprises, for example, a fingerprint sensor 360A, and/or, in some embodiments, one or more of other sensors, such a face or eye recognition sensor 360B and/or other biometric sensors 360n such as palm scanner, chemical (e.g., sweat, etc.) sensor, or other such sensors known in the art. In some embodiments, transaction card 110 may be configured to collect a set of fingerprint data from a plurality of such sensors that characterized a card owner's and/or authorized users' fingerprints associated with the use of the transaction card 110. In this way, the transaction card may collect fingerprint data defining verified fingerprint data associated with the known card owner and/or authorized user, e.g., information that defines definitive information associated with a known card owner and/or authorized user, such as recurring fingerprint data collected each time the card owner/user removes the transaction card from his or her wallet.

Further, according to various disclosed embodiments, circuitry 113 may be also configured to compare a current instance of collected fingerprint data to stored fingerprint reference data, e.g., to perform various actions such as: (i) activating or deactivating the card 110; and/or (ii) indicating to the card transacting device that the card 110 is invalid, or that the card 110 is in possession of a potentially fraudulent user. Here, in one embodiment, the fingerprint reference data including verified fingerprint may be stored in the data storage 230. In some implementations, the current information relating to the validation of the fingerprint verification associated with a current transaction attempt may be configured to be transmitted to a separate or remote server involved with validation of card transactions. In some other implementations, the fingerprint verification result of the current transaction and the fingerprint reference data may be configured to be compared by the card transacting device, and/or be compared by the transaction card 110 itself, to authenticate the transaction card 110 for the attempted transaction.

With regard to the fingerprint reference data, embodiments herein may be configured such that the transaction card 110 may collect and/or receive the authorized card users' fingerprints based on the verified user-specific fingerprint input during prior instances of the card sensor data recorded for authorized transactions performed using the transaction card 110. According to various embodiments, the fingerprint reference data may be initially collected and modified by various techniques. In some embodiments, for example, the user may authenticate with the mobile app, with the transaction card being wirelessly activated to capture fingerprint. Further, here, the mobile app may be configured to one or both of: (i) provide a second piece of the authentication to confirm that the customer has provided a fingerprint matching the fingerprint reference data, and/or (ii) store the new fingerprint as the authorized or accepted reference fingerprint. According to additional embodiments, the comparing the fingerprint data associated with the attempted transaction against the stored fingerprint reference data may comprise determining whether or not, or to what degree, the fingerprint data matches with one of the fingerprint reference data.

In some implementations, the fingerprint reference data may be encrypted for secure storage on the card 110, and/or for secure transmission from the card or elsewhere. Further, an encryption key utilized to decrypt the encrypted risk score may be stored on the card 110. According to some aspects, the user-specific risk profile validation model may be also encrypted for secure storage on the card 110.

Moreover, according to some embodiments, the transaction card 110 may further comprise a control circuit, which may be integral with the processor 210 or part of other card circuitry 113. Such control circuit may include an activation element configured to activate the card 110 responsive to one or both of: (i) an action or activity of a user of the card 110; and/or (ii) an output of the one or more sensors 250, occurring prior to current usage of the card 110 for a transaction at the card transacting device. The activation element may include and/or involve a fingerprint element 260, or the like. In various implementations, for example, the action or activity of the user that activates the transaction card 110 may comprise verifying that one or more fingerprints associated with the user are valid. In some embodiments, the control circuitry is configured, upon verifying that the one or more fingerprints are valid, to one or both of: allow the card to perform wireless communication to execute transactions; and/or activating the card for purpose of completing transactions.

Figure 4:
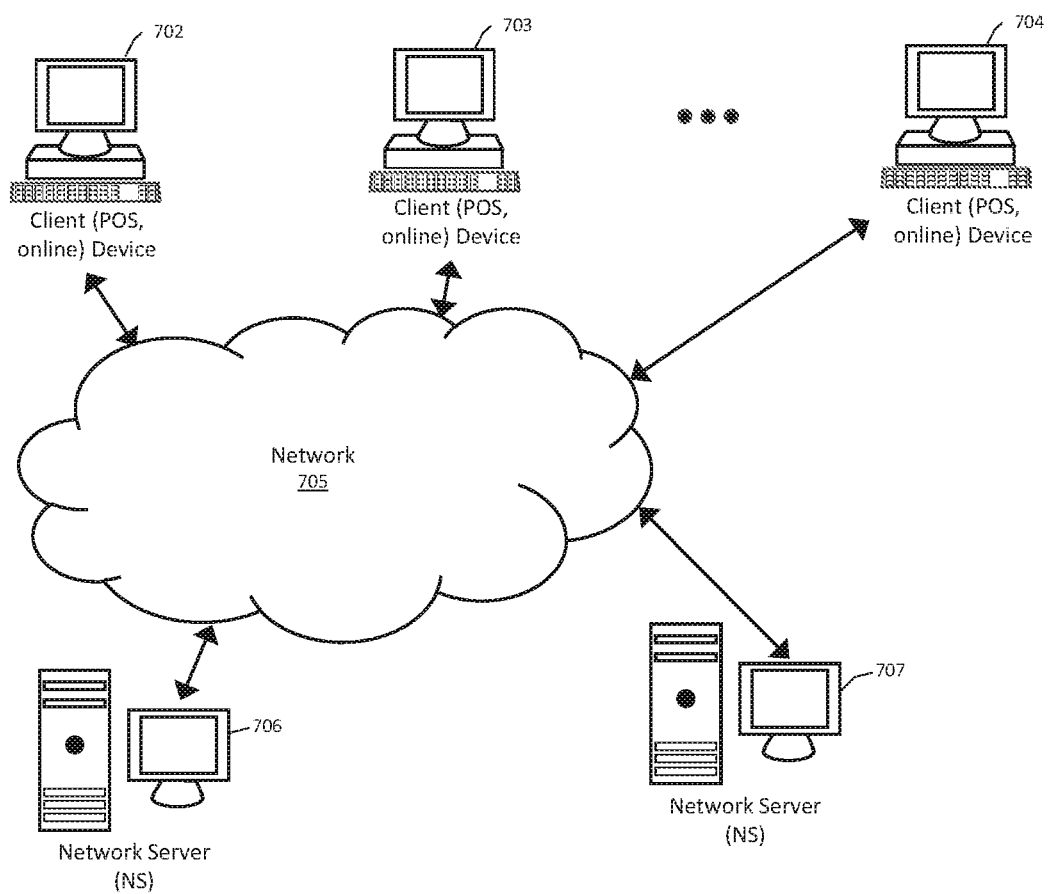
FIG. 4 is a block diagram depicting an exemplary computer-based system and/or platform, in accordance with certain embodiments of the present disclosure.

FIG. 4 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/ platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 4, members 702-704 (e.g., POS devices or clients, online entities, etc.) of the exemplary computer-based system/platform may include virtually any computing device capable of receiving and sending a message over a network (e.g., cloud network, etc.), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like.

In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
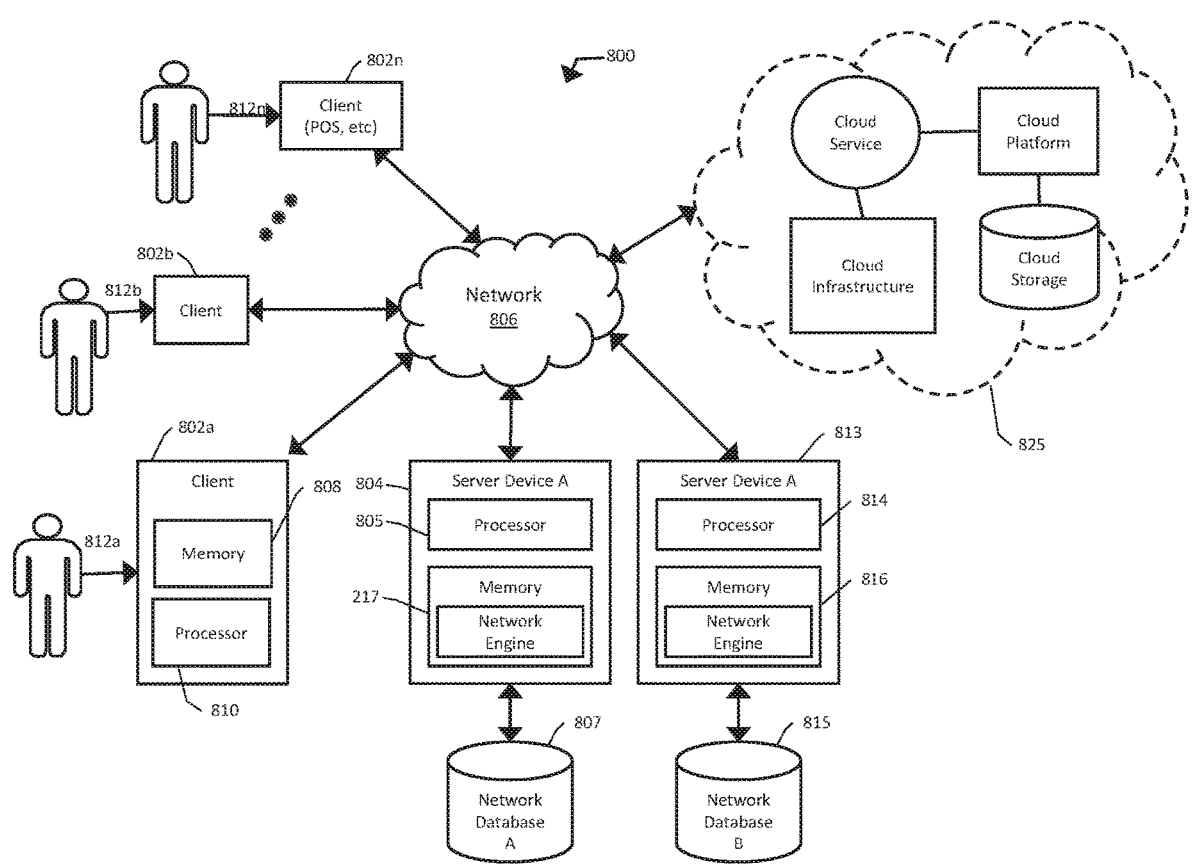
FIG. 5 is a block diagram depicting another exemplary computer-based system and/or platform, in accordance with certain embodiments of the present disclosure.

FIG. 5 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member or client computing devices (e.g., POS devices, online entities, etc.) 802a, 802b through 802n shown each at least includes computer-readable media, such as memory (e.g., RAM, etc.) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Per, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™ Mozilla Firefox, and/or Opera. In some embodiments, through the member computing client devices 802a through 802n, users, 812a through 802n, may communicate over the exemplary network 806 with each other and/or with other systems and/or devices coupled to the network 806. As shown in FIG. 5, exemplary server devices 804 and 813 may be also coupled to the network 806. In some embodiments, one or more member computing devices 802a through 802n may be mobile clients.

In some embodiments, at least one database of exemplary databases 807 and 815 may be any type of database, including a database managed by a database management system (DBMS).

In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
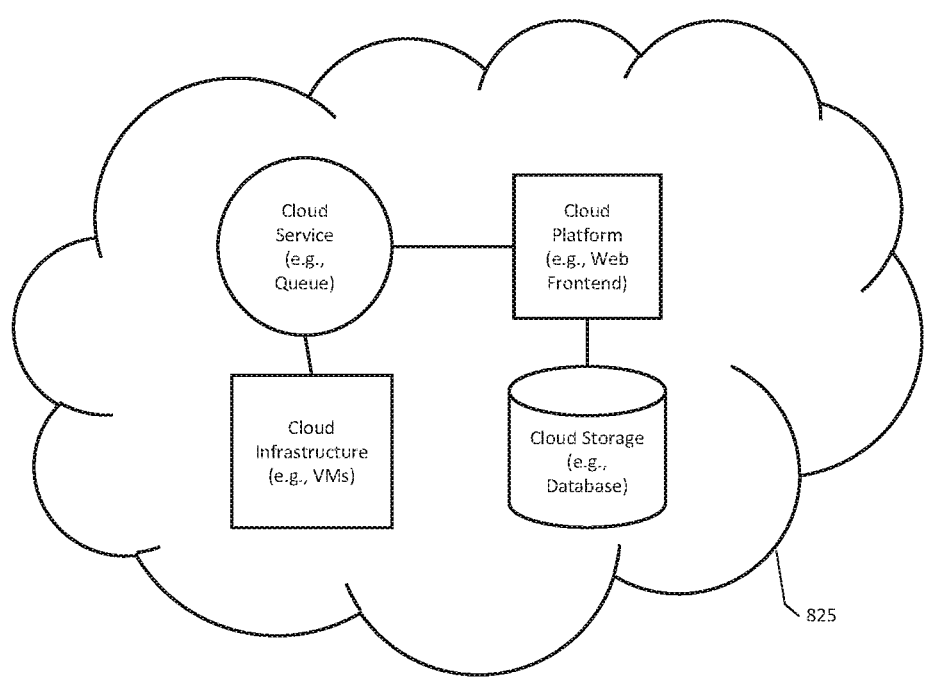
FIGS. 6 and 7 are diagrams illustrating two exemplary implementations of cloud computing architecture/aspects with respect to which the disclosed technology may be specifically configured to operate, in accordance with certain embodiments of the present disclosure.
Figure 7:
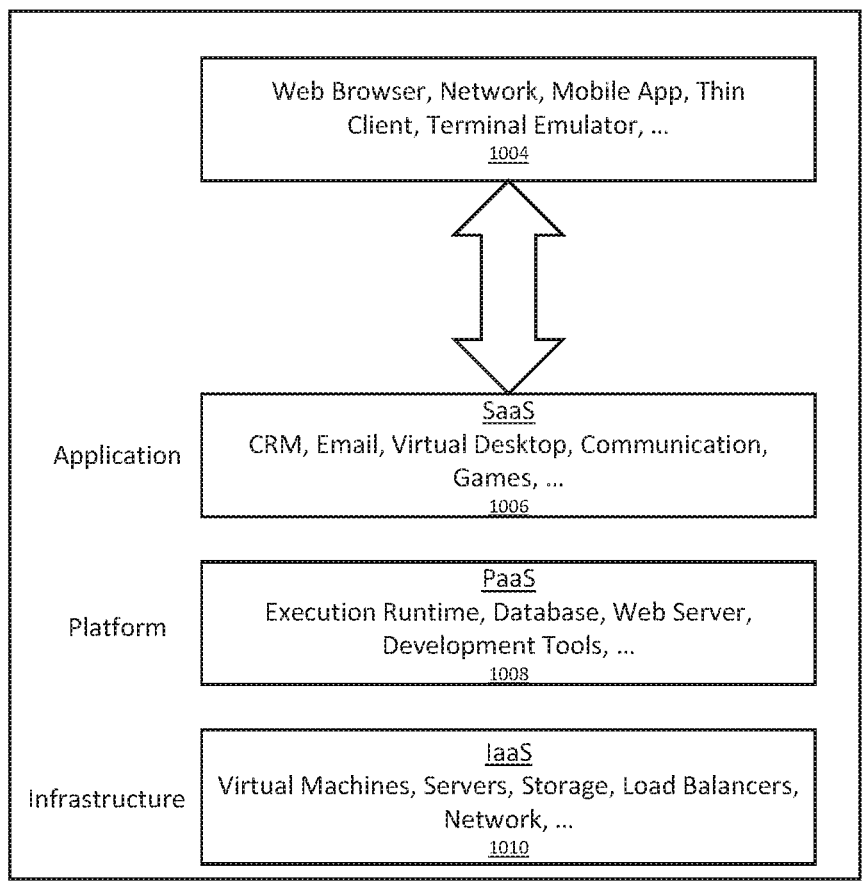

As also shown in FIGS. 6 and 7, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 6 and 7 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) Linux, (2) Microsoft Windows, (3) OS X (Mac OS), (4) Solaris, (5) UNIX (6) VM, (7) Android, (8) Java Platforms, (9) Open Web Platform, or other suitable computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A transaction card comprising:
  transaction circuitry; wherein the transaction circuitry is configured to conduct purchase transactions that involve:
    i) a wireless computing device that is in a wireless communication with the transaction card;
    ii) an entity associated with each respective transaction; and
    iii) a server associated with a provider of the transaction card;
  at least one fingerprint sensor; wherein the at least one fingerprint sensor is configured to:
    i) detect at least one fingerprint of a respective transaction card user associated with the transaction card to generate a fingerprint input data; and
    ii) provide the fingerprint input data to the transaction circuitry;
  data storage; wherein the data storage is configured to store fingerprint reference data;
  wherein the fingerprint reference data comprises verified fingerprint data corresponding to at least one fingerprint of each respective authorized individual who is authorized to use the transaction card;
  communication circuitry;
    wherein the communication circuitry is coupled to the transaction circuitry;
    wherein the communication circuitry comprises wireless communication circuitry; and card control circuitry; wherein the card control circuitry is operationally coupled to one or more of:
      i) the transaction circuitry,
      ii) the at least one fingerprint sensor, and
      iii) the communication circuitry;
    wherein the card control circuitry is configured to:
control one or both of the transaction circuitry and the communication circuitry based on a fingerprint verification that verifies based on the verified fingerprint data whether the at least one fingerprint of the respective transaction card user that has been detected by the at least one fingerprint sensor corresponds to the at least one fingerprint of a respective authorized individual; computer readable media storing instructions that, when executed by at least one processor, cause the card to perform operations comprising:
    transmitting, when a purchase transaction is attempted to an online entity, information related to validation of the fingerprint verification to the online entity by at least one of the wireless communication circuitry, the wireless computing device, the server, and a mobile device associated with the card user.

Clause 2. The card of clause 1 or any clause herein, wherein the wireless communication circuitry comprises a near field communication (NFC) chip and an NFC antenna; and wherein the control circuitry is configured, upon verifying that the one or more fingerprints are valid, to one or both of:
(i) allow the card to perform wireless communication to execute transactions; and
(ii) activating the card for purpose of completing transactions.

Clause 3. The card of clause 1 or any clause herein, wherein the wireless communication circuitry comprises Bluetooth circuitry for processing Bluetooth communications; wherein the Bluetooth circuitry comprises at least one Bluetooth antenna configured for Bluetooth low energy (BLE) communication.

Clause 4. The card of clause 3 or any clause herein, wherein the instructions of the computer readable media are further configured to:
  (i) activate the card control circuitry, when the card enters a proximal engagement with a point of sale terminal or a mobile device associated with the card user, from a sleep mode in which a transaction capability is disabled;
  (ii) activate, upon verifying that the one or more fingerprints are valid, the card for purpose of completing transactions; and
  (iii) transmit the transaction by the Bluetooth communications.

Clause 5. The card of clause 3 or any clause herein, wherein the computer readable media comprise:
an applet comprising instructions for validating the transaction or the card by requiring at least one of:
i) an additional validation action; and
ii) additional communication with an application on a mobile device associated with the card user.

Clause 6. The card of clause 3 or any clause herein, wherein the instructions of the computer readable media are further configured to:
(i) inform a point of sale (POS) terminal, at which the transaction is submitted, whether or not the card is authorized to complete the transaction; and
(ii) instruct a point of sale (POS) terminal to communicate by the Bluetooth communications with an application on a mobile device associated with the card user regarding performance of additional processing associated with the transaction attempt.

Clause 7. The card of clause 3 or any clause herein, wherein the card control circuitry is further configured to turn on or off the Bluetooth circuitry such that the card is not detectable by nearby Bluetooth devices.

Clause 8. The card of clause 1 or any clause herein, wherein the instructions of the one or more computer readable media cause the card to perform operations further comprising:
  transmitting, when the purchase transaction is attempted to a contactless, NFC-enabled point of sale (POS) terminal, information to the POS terminal regarding: (i) a status that the card is inactive, and (ii) that the card user must tap the card to the POS terminal with a valid fingerprint on the one or more fingerprint sensors to authorize the purchase transaction.

Clause 9. The card of clause 1 or any clause herein, wherein the one or more fingerprint sensors comprise:
  a first fingerprint sensor on a first face of the card, the first fingerprint sensor being located at a first particular region of one end of the card so that the first fingerprint sensor is positioned to receive a first fingerprint of a first finger that the user utilizes to grasp the card when making a contactless transaction with the card; and a second fingerprint sensor located on a second face of the card opposed to the first face, the second fingerprint sensor located at a second particular region of the second face of the card, wherein the second fingerprint sensor is positioned to receive a second fingerprint of a second finger that the user utilizes to grasp the card when making a contactless transaction with the card.

Clause 10. The card of clause 9 or any clause herein, wherein one or both of the first fingerprint sensor and the second fingerprint sensor comprise at least one tactile element that the user's fingers engage with to guide at least one finger into engagement with the card into a position where one or both of the first fingerprint and the second fingerprint are seated such that verification by the first fingerprint sensor and the second fingerprint sensor is provided.

Clause 11. The card of clause 9 or any clause herein, wherein selection of the user's fingers to which one or both of the first fingerprint sensor and the second fingerprint sensor correspond is customizable to the user.

Clause 12. The card of clause 1 or any clause herein, wherein the one or more components of the transaction circuitry are further configured to conduct transactions involving a point of sale (POS) device.

Clause 13. The card of clause 1 or any clause herein, wherein the transaction circuitry further comprises one or more of an EuroPay-MasterCard-Visa (EMV) chip, an EMV processor, an NFC chip and/or circuitry, and/or other circuitry specified elsewhere herein.

Clause 14. The card of clause 1 or any clause herein, wherein wireless access to user data on the card is disabled until the card is activated by verifying that the one or more fingerprints are valid.

Clause 15. The card of clause 1 or any clause herein, wherein the wireless communication circuitry comprises RFID communication circuitry.

Clause 16. The card of clause 1 or any clause herein, wherein the one or more fingerprint sensors comprise:

a first fingerprint sensor on a top surface of the card and positioned to receive a fingerprint of a finger that the user utilizes to hold the card when inserting the card into a point-of-sale (POS) device, wherein the top surface is a planar surface of the card that faces upward or toward the user when the card is inserted into the POS device;

wherein the first fingerprint sensor is: (i) positioned overlapping or adjacent a center axis of the card, and (ii) spaced along the center axis between a center point of the card and 1/16 inch from a first end of the card opposite to a second end of the card that is inserted into the POS device.

Clause 17. A transaction card comprising:
transaction circuitry;
wherein the transaction circuitry is configured to conduct purchase transactions that involve:
i) a wireless computing device that is in a wireless communication with the transaction card;
ii) an online entity associated with each respective transaction; and
iii) a server associated with a provider of the transaction card;
at least one fingerprint sensor;
wherein the at least one fingerprint sensor is configured to:
i) detect at least one fingerprint of a respective transaction card user associated with the transaction card to generate a fingerprint input data; and ii) provide the fingerprint input data to the transaction circuitry;
data storage;
wherein the data storage is configured to store fingerprint reference data;
wherein the fingerprint reference data comprises verified fingerprint data corresponding to at least one fingerprint of each respective authorized individual who is authorized to use the transaction card;
communication circuitry.
wherein the communication circuitry is coupled to the transaction circuitry; and
wherein the communication circuitry comprises one or both of a near field communication (NFC) circuit and a Bluetooth communication circuit; and
card control circuitry;
wherein the card control circuitry is operationally coupled to one or more of:
  i) the transaction circuitry,
  ii) the at least one fingerprint sensor, and
  iii) the communication circuitry;
wherein the card control circuitry is configured to:
  control one or both of the transaction circuitry and the communication circuitry based on a fingerprint verification that verifies based on the verified fingerprint data whether the at least one fingerprint of the respective transaction card user that has been detected by the at least one fingerprint sensor corresponds to the at least one fingerprint of a respective authorized individual;
  computer readable media storing instructions that, when executed by at least one processor, cause the card to perform operations comprising:
  transmitting, when a purchase transaction is attempted to an online entity, information confirming validation of the fingerprint verification to one or both of: (i) at least one merchant computer associated with the online entity, and (ii) the server associated with the provider of the transaction card, to authorize the transaction attempt.

Clause 18. The card of clause 17 or any clause herein, wherein the wireless communication circuitry comprises a near field communication (NFC) chip and an NFC antenna; and wherein the control circuitry is configured, upon verifying that the one or more fingerprints are valid, to one or both of:
(i) allow the card to perform wireless communication to execute transactions; and
(ii) activating the card for purpose of completing transactions.

Clause 19. The card of clause 17 or any clause herein, wherein the wireless communication circuitry comprises Bluetooth circuitry for processing Bluetooth communications;
wherein the Bluetooth circuitry comprises at least one Bluetooth antenna configured for Bluetooth low energy (BLE) communication.

Clause 20. The card of clause 19 or any clause herein, wherein the instructions of the computer readable media are further configured to:
  (i) activate the card control circuitry, when the card enters a proximal engagement with a point of sale terminal or a mobile device associated with the card user, from a sleep mode in which a transaction capability is disabled;
  (ii) activate, upon verifying that the one or more fingerprints are valid, the card for purpose of completing transactions; and (iii) transmit the transaction by the Bluetooth communications.

Clause 21. The card of clause 19 or any clause herein, wherein the computer readable media comprise:
an applet comprising instructions for validating the transaction or the card by requiring at least one of:
i) an additional validation action; and
ii) additional communication with an application on a mobile device associated with the card user.

Clause 22. The card of clause 19 or any clause herein, wherein the instructions of the computer readable media are further configured to:
(i) inform a point of sale (POS) terminal, at which the transaction is submitted, whether or not the card is authorized to complete the transaction; and
(ii) instruct a point of sale (POS) terminal to communicate by the Bluetooth communications with an application on a mobile device associated with the card user regarding performance of additional processing associated with the transaction attempt.

Clause 23. The card of clause 19 or any clause herein, wherein the card control circuitry is further configured to turn on or off the Bluetooth circuitry such that the card is not detectable by nearby Bluetooth devices.

Clause 24. The card of clause 17 or any clause herein, wherein the instructions of the one or more computer readable media cause the card to perform operations further comprising:
transmitting, when the purchase transaction is attempted to a contactless, NFC-enabled point of sale (POS) terminal, information to the POS terminal regarding: (i) a status that the card is inactive, and (ii) that the card user must tap the card to the POS terminal with a valid fingerprint on the one or more fingerprint sensors to authorize the purchase transaction.

Clause 25. The card of clause 17 or any clause herein, wherein the one or more fingerprint sensors comprise:
a first fingerprint sensor on a first face of the card, the first fingerprint sensor being located at a first particular region of one end of the card so that the first fingerprint sensor is positioned to receive a first fingerprint of a first finger that the user utilizes to grasp the card when making a contactless transaction with the card; and
a second fingerprint sensor located on a second face of the card opposed to the first face, the second fingerprint sensor located at a second particular region of the second face of the card, wherein the second fingerprint sensor is positioned to receive a second fingerprint of a second finger that the user utilizes to grasp the card when making a contactless transaction with the card.

Clause 26. The card of clause 25 or any clause herein, wherein one or both of the first fingerprint sensor and the second fingerprint sensor comprise at least one tactile element that the user's fingers engage with to guide at least one finger into engagement with the card into a position where one or both of the first fingerprint and the second fingerprint are seated such that verification by the first fingerprint sensor and the second fingerprint sensor is provided.

Clause 27. The card of clause 25 or any clause herein, wherein selection of the user's fingers to which one or both of the first fingerprint sensor and the second fingerprint sensor correspond is customizable to the user.

Clause 28. The card of clause 17 or any clause herein, wherein the one or more components of the transaction circuitry are further configured to conduct transactions involving a point of sale (POS) device.

Clause 29. The card of clause 17 or any clause herein, wherein the transaction circuitry further comprises one or more of an EuroPay-MasterCard-Visa (EMV) chip, an EMV processor, an NFC chip and/or circuitry, and/or other circuitry specified elsewhere herein.

Clause 30. The card of clause 17 or any clause herein, wherein wireless access to user data on the card is disabled until the card is activated by verifying that the one or more fingerprints are valid.

Clause 31. The card of clause 17 or any clause herein, wherein the wireless communication circuitry comprises RFID communication circuitry.

Clause 32. The card of clause 17 or any clause herein, wherein the one or more fingerprint sensors comprise:
a first fingerprint sensor on a top surface of the card and positioned to receive a fingerprint of a finger that the user utilizes to hold the card when inserting the card into a point-of-sale (POS) device, wherein the top surface is a planar surface of the card that faces upward or toward the user when the card is inserted into the POS device;
wherein the first fingerprint sensor is: (i) positioned overlapping or adjacent a center axis of the card, and (ii) spaced along the center axis between a center point of the card and $1/16$ inch from a first end of the card opposite to a second end of the card that is inserted into the POS device.

Clause 33. Embodiments herein may also take the form of a system comprised of components such as computing and/or computer-related elements that are arranged, programmed and/or otherwise adapted to perform the features and functionality set forth anywhere above. Such computing elements may include and/or involve computer readable media.

Clause 34. In addition, embodiments herein may also take the form of one or more computer-implemented methods and/or one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A transaction card comprised of a material, the transaction card comprising:
transaction circuitry embedded in the material, wherein the material forms the transaction card;
wherein the transaction circuitry is configured to conduct purchase transactions that involve:
i) a wireless computing device that is in wireless communication with the transaction card;
ii) an entity associated with each respective transaction; and
iii) a server associated with a provider of the transaction card;
at least one fingerprint sensor embedded in the material;
wherein the at least one fingerprint sensor comprises:

a first fingerprint sensor on a top surface of the card and positioned to receive a fingerprint of a finger that the user utilizes to hold the card when inserting the card into a point-of-sale (POS) device, wherein the top surface is a planar surface of the card that faces upward or toward the user when the card is inserted into the POS device;

wherein the first fingerprint sensor is: (i) positioned overlapping or adjacent a center axis of the card, and (ii) spaced along the center axis between a center point of the card and about 1/16 inch from a first end of the card opposite to a second end of the card that is inserted into the POS device; and wherein the at least one fingerprint sensor is configured to:
  i) detect at least one fingerprint of a respective transaction card user associated with the transaction card to generate a fingerprint input data; and
  ii) provide the fingerprint input data to the transaction circuitry;

data storage embedded in the material;
  wherein the data storage is configured to store fingerprint reference data;
  wherein the fingerprint reference data comprises verified fingerprint data corresponding to at least one fingerprint of each respective authorized individual who is authorized to use the transaction card;

communication circuitry embedded in the material;
  wherein the communication circuitry is coupled to the transaction circuitry;
  wherein the communication circuitry comprises wireless communication circuitry, the wireless communication circuitry comprising Bluetooth circuitry for processing Bluetooth communications, wherein the Bluetooth circuitry comprises at least one Bluetooth antenna configured for Bluetooth low energy (BLE) communication; and card control circuitry embedded in the material;
  wherein the card control circuitry is operationally coupled to one or more of:
    i) the transaction circuitry,
    ii) the at least one fingerprint sensor, and
    iii) the communication circuitry;
  wherein the card control circuitry is configured to:
    control one or both of the transaction circuitry and the communication circuitry based on a fingerprint verification that verifies based on the verified fingerprint data whether the at least one fingerprint of the respective transaction card user that has been detected by the at least one fingerprint sensor corresponds to the at least one fingerprint of a respective authorized individual; and computer readable media, embedded in the material, storing instructions that, when executed by at least one processor, cause the card to perform operations comprising:
  activating, upon verifying that the one or more fingerprints are valid, the card for purpose of completing transactions;
  activating, when the card enters a proximal engagement with a point of sale terminal or a mobile device associated with the card user, the card control circuitry from a sleep mode in which a transaction capability is disabled; and
  transmitting, when a purchase transaction is attempted to an online entity and the card is activated based on the fingerprint verification, information related to validation of the fingerprint verification to the online entity by at least one of the wireless communication circuitry, the wireless computing device, the server, and a mobile device associated with the card user.

2. The card of claim 1, wherein the wireless communication circuitry comprises a near field communication (NFC) chip and an NFC antenna; and
  wherein the control circuitry is configured, upon verifying that the one or more fingerprints are valid, to one or both of:
    (i) allow the card to perform wireless communication to execute transactions; and
    (ii) activating the card for purpose of completing transactions.

3. The card of claim 1, wherein the instructions of the computer readable media are further configured to:
  transmit the transaction by the Bluetooth communications.

4. The card of claim 1, wherein the computer readable media comprise:
  an applet comprising instructions for validating the transaction or the card by requiring at least one of:
    i) an additional validation action; and
    ii) additional communication with an application on a mobile device associated with the card user.

5. The card of claim 1 wherein the instructions of the computer readable media are further configured to:
  (i) inform a point of sale (POS) terminal, at which the transaction is submitted, whether or not the card is authorized to complete the transaction; and
  (ii) instruct the point of sale (POS) terminal to communicate wirelessly with an application on a mobile device associated with the card user regarding performance of additional processing associated with the transaction attempt.

6. The card of claim 1 wherein the card control circuitry is further configured to turn on or off the Bluetooth circuitry such that the card is not detectable by nearby Bluetooth devices.

7. The card of claim 1 wherein the instructions of the one or more computer readable media cause the card to perform operations further comprising:
  transmitting, when the purchase transaction is attempted via a contactless, NFC-enabled point of sale (POS) terminal, status information to the POS terminal regarding: (i) a status of the card, identifying that the card is inactive, and (ii) an instruction requiring the card user to contact or wirelessly interact with the POS terminal with the card having a valid fingerprint obtained by the one or more fingerprint sensors to authorize the purchase transaction.

8. The card of claim 1 wherein the one or more fingerprint sensors comprise:
  a first fingerprint sensor on a first face of the card, the first fingerprint sensor being located at a first particular region of one end of the card so that the first fingerprint sensor is positioned to receive a first fingerprint of a first finger of the user when the user utilizes the first finger to grasp the card when making a contactless transaction with the card; and
  a second fingerprint sensor located on a second face of the card opposed to the first face, the second fingerprint sensor located at a second particular region of the second face of the card, wherein the second fingerprint sensor is positioned to receive a second fingerprint of a second finger of the user when the user utilizes the second finger to grasp the card when making a contactless transaction with the card.

9. The card of claim 8 wherein one or both of the first fingerprint sensor and the second fingerprint sensor comprise at least one tactile element configured such that to guide at least one finger engaged with the card into a position where one or both of the first fingerprint and the second fingerprint are seated such to facilitate a respective verification by the first fingerprint sensor and the second fingerprint sensor.

10. The card of claim 8 wherein selection of the user's fingers to which one or both of the first fingerprint sensor and the second fingerprint sensor are configured to adapted to a respective finger of the user.

11. The card of claim 1 wherein the one or more components of the transaction circuitry are further configured to conduct transactions involving a point of sale (POS) device.

12. The card of claim 1 wherein the transaction circuitry further comprises one or more of an EuroPay-MasterCard-Visa (EMV) chip, an EMV processor, and/or a near field communication (NFC) or BlueTooth chip and/or circuitry.

13. The card of claim 1 wherein wireless access to user data on the card is disabled until the card is activated by verifying that the one or more fingerprints are valid.

14. The card of claim 1 wherein the wireless communication circuitry comprises RFID communication circuitry.

15. The card of claim 1 wherein the first fingerprint sensor is positioned to receive a first fingerprint of a first finger of the user when the user utilizes the first finger to grasp the card when making a contactless transaction with the card; and wherein the at least one fingerprint sensor further comprises:
a second fingerprint sensor located on a second face of the card opposed to the first face, the second fingerprint sensor located at a second particular region of the second face of the card, wherein the second fingerprint sensor is positioned to receive a second fingerprint of a second finger of the user when the user utilizes the second finger to grasp the card when making a contactless transaction with the card.

16. A transaction card comprised of a material, the transaction card comprising:
transaction circuitry embedded in the material, wherein the material forms the transaction card;
wherein the transaction circuitry is configured to conduct purchase transactions that involve:
i) a wireless computing device that is in a wireless communication with the transaction card;
ii) an online entity associated with each respective transaction; and
iii) a server associated with a provider of the transaction card;
at least one fingerprint sensor embedded in the material;
wherein the at least one fingerprint sensor comprises:
a first fingerprint sensor on a top surface of the card and positioned to receive a fingerprint of a finger that the user utilizes to hold the card when inserting the card into a point-of-sale (POS) device, wherein the top surface is a planar surface of the card that faces upward or toward the user when the card is inserted into the POS device and the first fingerprint sensor is positioned to receive a first fingerprint of a first finger of the user when the user utilizes the first finger to grasp the card when making a contactless transaction with the card; and a second fingerprint sensor located on a second face of the card opposed to the first face, the second fingerprint sensor located at a second particular region of the second face of the card, wherein the second fingerprint sensor is positioned to receive a second fingerprint of a second finger of the user when the user utilizes the second finger to grasp the card when making a contactless transaction with the card:
wherein the at least one fingerprint sensor is configured to:
i) detect at least one fingerprint of a respective transaction card user associated with the transaction card to generate a fingerprint input data; and
ii) provide the fingerprint input data to the transaction circuitry;
data storage embedded in the material;
wherein the data storage is configured to store fingerprint reference data;
wherein the fingerprint reference data comprises verified fingerprint data corresponding to at least one fingerprint of each respective authorized individual who is authorized to use the transaction card;
communication circuitry embedded in the material;
wherein the communication circuitry is coupled to the transaction circuitry; and
wherein the communication circuitry comprises one or both of a near field communication (NFC) circuit and a Bluetooth communication circuit; and
card control circuitry embedded in the material;
wherein the card control circuitry is operationally coupled to one or more of:
i) the transaction circuitry,
ii) the at least one fingerprint sensor, and
iii) the communication circuitry;
wherein the card control circuitry is configured to:
control one or both of the transaction circuitry and the communication circuitry based on a fingerprint verification that verifies based on the verified fingerprint data whether the at least one fingerprint of the respective transaction card user that has been detected by the at least one fingerprint sensor corresponds to the at least one fingerprint of a respective authorized individual;
computer readable media, embedded in the material, storing instructions that, when executed by at least one processor, cause the card to perform operations comprising:
activating, upon verifying that the one or more fingerprints are valid, the card for purpose of completing transactions;
activating, when the card enters a proximal engagement with a point of sale (POS) terminal, the card control circuitry from a sleep mode in which a transaction capability is disabled, including:
(i) informing the POS terminal, at which the transaction is submitted, whether or not the card is authorized to complete the transaction; and
(ii) instructing the POS terminal to communicate wirelessly with an application on a mobile device associated with the card user regarding performance of additional processing associated with the transaction attempt:
transmitting, when a purchase transaction is attempted to an online entity and the card is activated based on the fingerprint verification, information related to validation of the fingerprint verification to the online entity by at least one of the wireless communication circuitry, the wireless computing device, the server, and a mobile device associated with the card user.

17. The card of claim 16, wherein the wireless communication circuitry comprises a near field communication (NFC) chip and an NFC antenna; and wherein the control circuitry is configured, upon verifying that the one or more fingerprints are valid, to one or both of:
  (i) allow the card to perform wireless communication to execute transactions; and
  (ii) activating the card for purpose of completing transactions.

18. The card of claim 16 wherein the wireless communication circuitry comprises Bluetooth circuitry for processing Bluetooth communications;

wherein the Bluetooth circuitry comprises at least one Bluetooth antenna configured for Bluetooth low energy (BLE) communication.

19. The card of claim 18, wherein the instructions of the computer readable media are further configured to:
  (i) activate the card control circuitry, when the card enters a proximal engagement with a point of sale terminal or a mobile device associated with the card user, from a sleep mode in which a transaction capability is disabled;
  (ii) activate, upon verifying that the one or more fingerprints are valid, the card for purpose of completing transactions; and
  (iii) transmit the transaction by the Bluetooth communications.

20. The card of claim 16, wherein the computer readable media comprise:

an applet comprising instructions for validating the transaction or the card by requiring at least one of:
  i) an additional validation action; and
  ii) additional communication with an application on a mobile device associated with the card user.

21. The card of claim 16 wherein the card control circuitry is further configured to turn on or off the Bluetooth communication circuit such that the card is not detectable by nearby Bluetooth devices.

22. The card of claim 16 wherein the instructions of the one or more computer readable media cause the card to perform operations further comprising:

transmitting, when the purchase transaction is attempted via a contactless, NFC-enabled point of sale (POS) terminal, status information to the POS terminal regarding: (i) a status of the card, identifying that the card is inactive, and (ii) an instruction requiring the card user to contact or wirelessly interact with the POS terminal with the card having a valid fingerprint obtained by the one or more fingerprint sensors to authorize the purchase transaction.

23. The card of claim 16 wherein the at least one first fingerprint sensor is: (i) positioned overlapping or adjacent a center axis of the card, and (ii) spaced along the center axis between a center point of the card and about $\frac{1}{16}$ inch from a first end of the card opposite to a second end of the card that is inserted into the POS device.

* * * * *